United States Patent Office 3,164,759
Patented Jan. 5, 1965

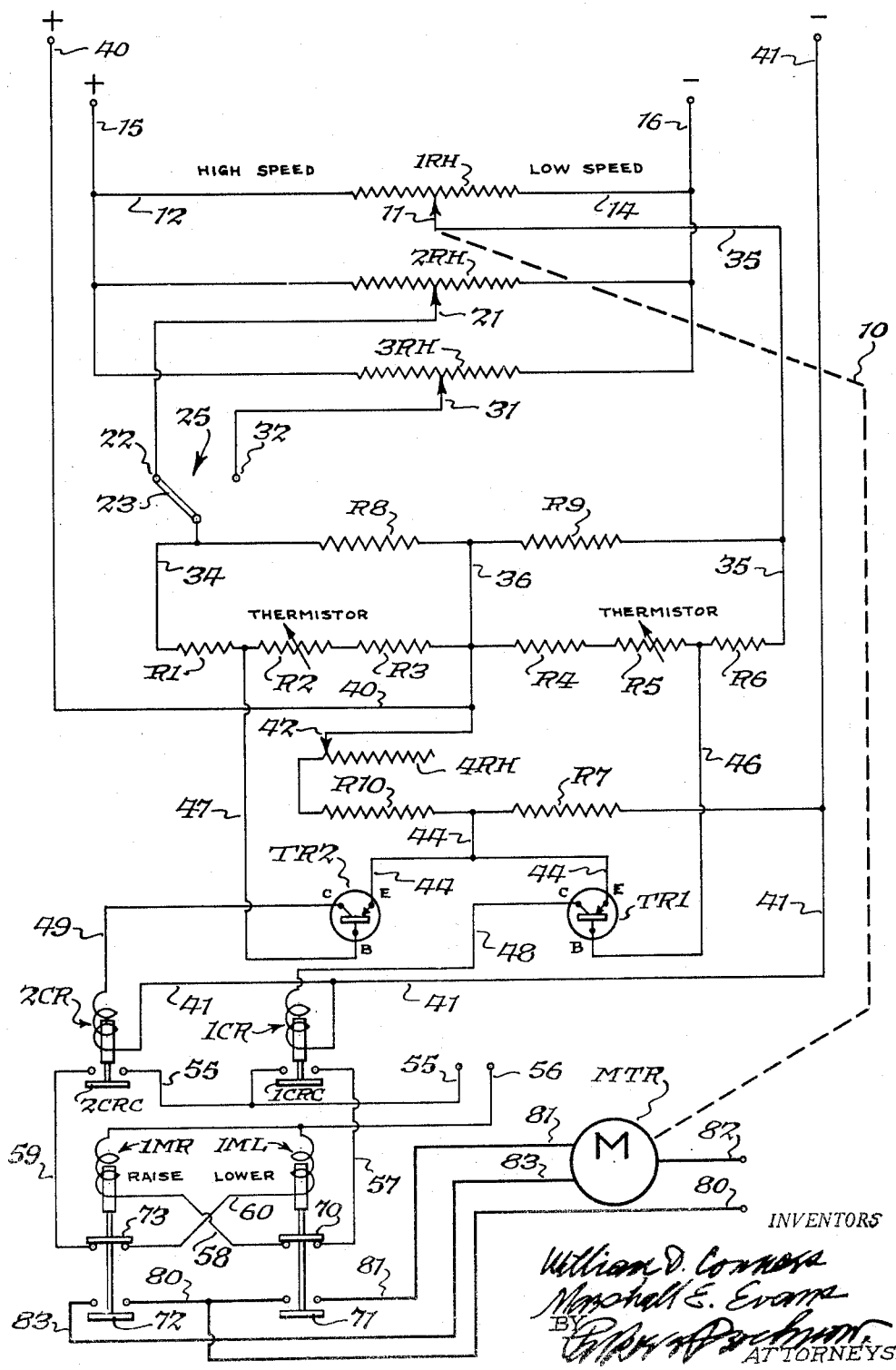

3,164,759
SELECTIVE POSITION CONTROLLER CIRCUIT
William D. Connors, Horseheads, N.Y., and Marshall E. Evans, Millerton, Pa., assignors to Hardinge Brothers, Inc., Elmira, N.Y.
Filed Aug. 7, 1962, Ser. No. 215,421
15 Claims. (Cl. 318—28)

This invention relates to a control circuit for selectively and continuously positioning a machine part, such as, for example, a speed change pulley from its slowest speed position to its highest speed position.

Prior devices of this type have, in most respects, functioned quite satisfactorily, especially where the device itself was composed entirely of the mechanical components. With the advent of recent advances in the electronic art, it has become desirable to incorporate some of these techniques to what was formerly strictly mechanical. By the use of electronic circuitry, it is possible to provide both continuous and accurate control. This conversion from mechanical to electronic control has, however, introduced additional problems. One of these, in addition to others, being the limited temperature range over which accurate control can be achieved, due in part to the temperature dependence of various electronic components.

It is therefore an object of this invention to provide an inexpensive, simple, accurate, adjustable position controller.

Another object is to provide a circuit which will be stable to eliminate hunting or overshoot of the positioning equipment with its consequent inaccuracies in control and the wear and tear on the mechanical equipment associated therewith.

A further object is to provide a control circuit adaptable to ordinary temperature use and provided with adjustment capability for use under higher than ordinary temperature use.

Still another object is to provide a control circuit giving infinite positioning of the part under control as distinguished from step to step control.

The illustrated embodiment of the invention in the single figure of the drawing has a reversible positioning motor MTR which, for example, might be connected by way of its shaft to rotate a screw shaft connected to a variable speed change pulley carrier (not shown), to move this carrier so that it will increase or decrease the speed of a machine driven by a constant speed motor dependent on the angular rotation of the motor MTR. This motor is operable to rotate in either of two directions, depending, for example on the polarity of the power supplied or the armature and field connections.

Such a speed carrier, which can be employed herein, is shown and described in Patent No. 2,695,529 issued to L. R. Evans, Nov. 30, 1954. In this patent the speed pulley carrier could be the frame and the aforementioned screw shaft could be the threaded shaft rotated by the positioning motor MTR. Upon selection of the speed desired by adjustment of a control knob the present invention would automatically move the speed change pulley to a position that would operate the spindle of the Evans patent at the speed selected.

In the form of the invention shown, the driven tracking potentiometer 1RH is suitably connected through a gear reduction (not shown), but indicated by the dotted line 10 to the positioning motor MTR. This connection provides full range movement of both the potentiometer slide contact arm 11 and simultaneously either through the same coupling or by a separate connection the speed change carrier. For convenience in describing the position of the speed change carrier, the word RAISE will indicate an elevated position which corresponds to the HIGH speed position, while the word LOWER will indicate and corresponds to the depressed position and the low speed position with the raising and lowering of the carrier the contact arm 11 of potentiometer 1RH traverses its full resistance range. The contact arm 11 of the potentiometer 1RH is coupled to MTR such that it will be to the left at high speed and to the right at the low speed position. The end terminals 12 and 14 of the potentiometer 1RH are connected by way of lines 15 and 16 to a direct current source which may, for example, be approximately 20 volts.

Connected in parallel and across the lines 15 and 16 are a high speed control manual set potentiometer 2RH and a low speed control potentiometer 3RH. The slide contact arms 21 and 31 of potentiometers 2RH and 3RH are connected to a pair of stationary contacts 22 and 32 of single pole-double throw switch 25, while the switch pole 23 will alternately contact one or the other of the contacts 22 and 32. Where it is desired to include additional control potentiometers for intermediate speeds, a single pole multiple throw switch such as a rotary switch can be substituted for the switch 25. The switch pole 23 via line 34 is connected to one end of resistor R8 which, in turn, has its opposite end connected through resistor R9 to slide contact arm 11 of 1RH by line 35. Connected across each of the fixed resistors R8 and R9 is a series combination of matched components comprising fixed resistors R1, R6, (a) variable resistance elements having negative temperature coefficients such as thermistors R2 and R5, and other fixed resistors R3 and R4. The midpoints of both series lines are joined to one another and to the slide arm 42 of rheostat or variable resistor 4RH.

Thermistor, which is a contraction of the words thermal resistor is a resistive element which exhibits a negative temperature coefficient. As opposed to the ordinary resistor its resistance decreases with increasing ambient temperature.

Direct current of a voltage slightly higher than that applied across 1RH, say 24 volts, is provided with the polarity as shown, across lines 40 and 41. A variable resistor 4RH has its contact arm 42 connected to the juncture of the lines 36 and 40 while the one terminal of 4RH is connected to the outer terminal of resistor R10. The outer terminal of resistor R7 is connected to the negative line 41 while both of the inner terminals of R10 and R7 are joined to connect to the line 44 which line is common to the emitters E of the transistors TR1 and TR2. The base B of the transistor TR1 is connected by a line 46 to the juncture of the thermistor R5 and fixed resistor R6 while the base B of transistor TR2 is connected by a line 47 to the juncture of thermistor R2 and the fixed resistor R1. The collector C of transistor TR1 is connected by the line 48 to one side of a relay 1CR while its other side is connected to the negative side of the line 41. Also collector C of transistor TR2 is connected by the line 49 to one side of a relay 2CR while its other side is connected to the negative line 41.

Relays 1CR and 2CR carry contactors 1CRC and 2CRC respectively, which upon energization of these relays close across their own contacts. A suitable electrical power supply has one line 55 thereof connected to one contact of each relay while its other line 56 is connected to each of the relay coils of relays 1MR and 1ML. These motor relays each carry two sets of contactors; one set (71, 72) which is normally open and the other set (70, 73) which is normally closed. The free ends of the relay coils are cross coupled by wires 58 and 60 to contacts on opposite relays which are normally closed. The other contacts of these normally closed contactors are connected by wires 57 and 59 to the free contacts of normally open relays 1CR and 2CR. The normally open contacts associated with contactors 71 and 72 have connected thereto the line 80 which carries energizing current for MTR and lines 81 and 83. These lines individually complete with line 82 the MTR supply circuit. This interconnection is necessary in order to prevent simultaneous energization of relays 1MR and 1ML and thereby cause damage to MTR. Thus, when relay 1CR is energized and its contactor 1CRC closes to provide current from line 55 to the line 57, closed contactor 70, line 58, winding of relay 1MR to the line 57, closed contactor 70, line 58, winding of relay 1MR other line 56, completing the circuit and energizing relay 1MR, it can do this only with relay 1ML deenergized and its contactor 70 closed.

Conversely, when relay 2CR is energized and its contactor 2CRC closed to provide current from line 55 to the line 59, closed contactor 73, line 60, winding of relay 1ML to the other line 56, completing the circuit and energizing relay 1ML, it can do this only with relay 1MR deenergized and its contactor 73 closed.

The normally open contactor 71 of relay 1ML when closed provides suitable current to the "lower" winding of the positioning motor MTR through the line 80, now closed contactor 71, line 81, "lower" winding of motor MTR to the other side of line 82, thus lowering the speed change pulley carrier to decrease the speed of a driven shaft or lathe spindle for example.

If the normally open contactor 72 of relay 1MR is closed, current will then flow from the line 80, now closed contactor 72 to the line 83 "raise" winding of positioning motor MTR to the other side of the line 82, thus reversing the motor and raising the speed change pulley carrier to increase the speed of a driven shaft.

*Operation*

As previously mentioned, the contactor 11 of potentiometer 1RH is mechanically connected to the positioning motor MTR and is therefore always in some position related to the angular displacement of the MTR shaft. Now initially let us assume that the motor MTR is in some raise or high speed with position and the machine operator, in order to lower the speed, moves the knob of the potentiometer 2RH contact arm 21 to the right. This means that contact arm 11 of 1RH will be located toward the left end of potentiometer 1RH while the slide contact arm 21 of potentiometer 2RH has been moved toward the right end of 2RH.

This brings about the following conditions. Since current is flowing from the positive line 15 through these potentiometers 1RH and 2RH to the negative line 16, the contact arm 11, now being toward the left on 1RH, will be more positive in potential than the contact arm 21 which is now toward the right on 2RH. Thus current will flow from line 15, 1RH, contact arm 11, line 35 through the fixed resistances R9 and R8, to line 34, switch pole 23, which we will assume is now closed and in the high speed position (contact 22), contact arm 21, potentiometer 2RH to the negative side of line 16.

The fixed resistors R8 and R9 are matched units and therefore have an equal voltage drop across them, providing initial circuit balance. Current also flows through fixed resistance R6, thermistor R5 and fixed resistance R4 to the fixed resistance R3, thermistor R2 and resistor R1 to line 34, pole 23, contact 22, slide contact arm 21, potentiometer 2RH to the negative side of the line 16. Thus, a current is initiated which flows across the above mentioned parallel loops and produces voltage drops therethrough. Since current flows from right to left, the potential at the juncture of R3 and R4 is now more positive than the potential at the junction of R1 and R2, and emitter E of transistor TR2 will be more positive than its base B, while the emitter of transistor TR1 will be more negative than its base and is effectively cut off. This condition of the transistor TR2 in having its emitter E positive with respect to its base B causes a small emitter to base current flow which, in turn, controls and allows a much larger emitter E to collector C current to flow, thus energizing the relay 2CR in the following manner. Current from the 24 volt source flows via the line 40, contact arm 42, resistor R10, line 44, emitter E to collector C, line 49, coil of relay 2CR, line 41, to the negative side of the line 41, thereby energizing relay 2CR and closing its contacts through contactor 2CRC. Closing of these contacts allows current to flow from line 55, contactor 2CRC, line 59, normally closed contactor 73, line 60, coil winding of "lower" relay 1ML back to the negative side of the line 56. Thus, the relay 1ML is now energized and the interlock contactor 70 now opens to prevent any possibility of the "raise" relay 1MR being energized and also the contactor 71 closes. This later closing energizes the "lower" winding of the positioning motor MTR and it will now lower the speed change pulley carrier to lower the speed of the driven shaft or spindle. At the same time as this is going on, the contact arm 11 of potentiometer 1RM is being moved toward the right end of 1RH. When the arm 11 reaches a point on 1RH where there is no potential difference between it and the potential at the arm 21 of 2RH, the loop current flowing between these potentiometers ceases, thereby reducing the emitter to base potential until collector current is cut off and the relay 2CR becomes deenergized and opens its contactor 2CRC, deenergizing the relay 1ML, opening the contact 71 and thus cutting off current to the "lower" winding of the positioning motor MTR. The speed change pulley will now be positioned so that the speed of the driven spindle is that to which the potentiometer knob of contact arm 21 has been set.

If the opposite condition to that just described would prevail, i.e., where we would want to increase the speed of the driven spindle, the knob of the contact arm 21 of the potentiometer 2RH would be set to the higher speed (toward left end) the junction of R5 and R6 would become more negative than the juncture of R3 and R4 which would cause current to flow to the emitter E of the transistor TR1 from line 44 to the base B, line 46, resistor R6, line 35, contact arm 11, potentiometer 1RH, line 14 to line 16. With transistor TR1 having its emitter E positive in respect to its base B, it will cause a larger current to flow from emitter E to collector C and energize the relay 1CR which in turn will energize the motor relay 1MR and close its contactor 72 to energize the "raise" winding of the motor MTR. Motor MTR will then change the speed pulley setting as well as the position of contact arm 11 of potentiometer 1RH to cause the spindle speed to increase and bring the circuit into potential equilibrium where transistor TR1 will cease to conduct and thus deenergize both relay 1CR and 1MR and open the contact 72 to the "raise" winding of the positioning motor MTR.

The high-low selector switch 25 may be used in any position, either high or low. As just described, when the pole 23 is closed to contact 22, the potentiometer 2RH is in the circuit while contactor 32 is open and the potentiometer 3RH does not form a part of the circuit. The advantage of having the high-low switch is that both of the potentiometers 2RH and 3RH may be preset to a high speed and a low speed, making it possible to switch from one preset speed to another preset speed by merely throwing the switch 25 from high position to low position. These potentiometers perform exactly the same function in the circuit except that in order to obtain preset conditions, these components must be initially adjusted individually to different settings.

Viewing the circuit in its entirety, a D.C. voltage is applied across a parallel combination of two or more potentiometers. The slide contacts of two of the potentiometers are each selected and connected by a switch into a common series loop circuit containing a number of resistive elements with a center tap. Where the voltages at the slide contacts of the potentiometers are different, a current will flow around this loop and create a potential drop across the resistive elements. The potentials at each outer end of the resistive loop are separately applied to the base of each of two transistors while the center tap is applied to the emitters of the transistors. Since at any one time current through the loop can flow only in one direction, then one of the transistors will be forward biased and in the conduction state. The direction of current flow being only dependent on the relative slide contact positions, thereby establishing the conduction of one transistor when one slide contact is more positive and alternately conduction of the other transistor, when the other slide contact is more positive. In other words, each slide contact controls the conduction of one of the transistors, depending on whether it is more positive than the other contact arm.

A second D.C. voltage is applied individually between the emitter and collector of each transistor. One such circuit has in series therein a relay for controlling one direction of rotation of a motor while the other has a relay for control in the opposite direction. The overall effect is that each transistor by its conduction controls motor rotation, one transistor in one direction and the other transistor in the opposite direction. With one of the potentiometers mechanically coupled to the motor for rotation or relative movement therewith the system becomes a mechanical electrical feedback loop which tracks one potentiometer (driven) to the position of the other potentiometer and in so doing may be mechanically coupled to control the speed of another machine by setting the slide contact of the other potentiometer.

The control device of this invention is generally mounted adjacent or on the machine whose operation it is to control and so, is subject to a wide range of temperatures. As for example, under ideal conditions, it would be at approximately normal room temperature, while on the other hand, when the machine becomes heated or direct sunlight impinges on the device, its temperature might rise to 130° F. Therefore, accurate and stable control must be available over a temperature range of 65° F. to 130° F. with particular attention to field adjustments for climatic environments such as are encountered in various parts of this country. Although transistor circuitry offers many advantages, it is well known that transistors are temperature-sensitive, especially in the environment under which this invention must be used. Specifically, emitter current increases with an increase in transister temperature so that in the illustrated embodiment in order to attain a relatively constant emitter current and therefore good control of the emitter-collector conduction, the selectively variable thermistors R2 and R5 are employed in the divider network to compensate for the change in the emitter to base resistance of the transistors due to ambient temperature increase and 4RH is employed to limit the emitter current. In this respect let us assume without temperature compensation and an ambient temperature of 72° F. the motor would rotate until potentiometer 1RH slide assumed a position so as to decrease the loop current to approximately zero. This position could be varied somewhat before one of the transistors was caused to conduct and this is generally referred to as the "dead band", or it is that distance through which one of the slide contacts could be moved before any motor response is initiated. However, with increased ambient temperatures, this "dead band" is progressively narrowed until at approximately 95° F. the device loses stability and in effect hunts or oscillates about the "dead band." The thermistors decrease in resistance with increased temperature so that the voltage drop there across is reduced and thereby decreases the emitter-base current to maintain or restore the balance and broaden the "dead band." With the component values indicated hereinafter, the controller functions properly over a range from 65° F. to approximately 100° F., but where higher temperatures are encountered, all the resistance of 4RH is placed in the emitter circuit, thereby further limiting this emitter current and permitting operation from 95° F. to 130° F. Of course, any intermediate settings of 4RH might be used with the corresponding temperature range.

The values of the resistor components suitable for stable operation of the circuit of this invention just described are listed below, but it is to be understood that these will vary, depending upon the application this circuit is put to in use.

| | Ohms |
|---|---|
| Potentiometers 1RH, 2RH and 3RH | 2500 |
| Resistors R8 and R9 | 2500 |
| Resistors R1 and R6 | 50 |
| Thermistors R7 and R5, at 25° C. | 300 |
| Resistor R7 | 1000 |
| Resistor R10 | 1 |
| Thermistors R7 and R5, at 25° C. | 300 |
| Variable resistor 4RH | 3 |

From the foregoing description, it will be obvious that the present invention permits of an infinite number of positions of the positioning motor MTR without steps by the simple adjustments of the potentiometers to the desired speeds or positions. By use of the switch 25, preset speeds or positions may be had by simply throwing the switch to either position. Temperature compensation is automatically obtained by use of the thermistors R2 and R5 and low or high ambient temperatures may be compensated for by adjustment of the variable resistor 4RH.

It will be understood that various changes in the details, materials and arrangements of parts which have been herein described and illustrated in order to explain the nature of this invention may be made by those skilled in the art within the principle and scope of the invention as expressed in the appended claims.

We claim:

1. In a selective position control system of the type having a reversible motor whose shaft is coupled to and positions an element by its angular displacement that circuit which comprises a plurality of potentiometers each having a slidable contact arm, a voltage source connected directly across each of said potentiometers, drive means coupling said shaft and the slidable contact of one of said potentiometers for relative movement therewith, a pair of transistors each having an emitter, a base and a collector electrode, a resistive voltage divider network having a center tap, and having one end thereof connected to the slidable contact of said one potentiometer, switch means selectably operable for connecting individually one of the slidable contacts of the remaining potentiometers to the other end of said divider network, first means responsive to the conduction of one of said transistors to cause said motor to rotate in one direction, second means responsive to the conduction of the other of said transistors to cause said motor to rotate in the opposite direction, said center tap connected to the emitters of both ransistors, the base electrode of said one transistor connected intermediate said center tap and one end of said divider, the base electrode of said other transistor connected intermediate said center tap and the other end of said divider, whereby said motor will be caused to rotate to a position at which the potentials at the slide contacts of the potentiometers connected across said divider network will be equal.

2. In a continuously selective position control system of the type employing a reversible positioning motor whose shaft, by way of its angular displacement, controls the speed of a spindle, that circuit operable under high ambient temperatures which comprises: a driven, a high speed and a low speed potentiometer, each of said potentiometers having a slide contact arm, a first voltage source connected across all of said potentiometers, means coupling said shaft and the slide contact of said driven potentiometer for relative movement therewith, a pair of transistors each having an emitter, a base and a collector electrode, a single pole multiple throw switch having one each of its fixed contacts connected to the slide contacts of said high and said low speed potentiometers, a series combination of a pair of matched fixed resistors, a second series combination of a first fixed resistor, a variable negative temperature coefficient resistor, a second fixed resistor, a third fixed resistor, a second variable negative temperature coefficient resistor and a fourth fixed resistor, one end of each of said combinations connected to the movable pole contact of said switch and the other end thereof connected to the slide contact of said driven potentiometer, a variable resistor, the junction of said matched resistors and the junction of second and third fixed resistors connected to one end of said variable resistor, the other end of said variable resistor connected to the emitters of said transistors, the base of one of said transistors joined to the junction of said first resistor and said negative temperature coefficient resistor, the base of the other of said transistors joined to the junction of said fourth resistor and said second negative temperature coefficient resistor, a second voltage source connected across said variable resistor and the collector electrodes of said transistors, a pair of relays responsive to the emitter-collector conduction of each of said transistors for controlling the angular displacement of said shaft in accordance therewith whereby said driven potentiometer slide contact arm will be varied in response to adjustment of said high and low speed potentiometers.

3. In a continuously selective position control system of the type having a reversible motor whose shaft is coupled to and positions an element by its angular displacement that circuit operable over high ambient temperatures which comprises: a high speed, a low speed and a driven potentiometer, each of said potentiometers having a slidable contact arm, a first voltage source connected across all of said potentiometers, means coupling said shaft and the slidable contact of said driven potentiometer for relative movement therewith, a pair of transistors each having an emitter, a base and a collector electrode, a first loop circuit having in series therein the slidable contact of said driven potentiometer, a pair of resistive elements, switch means for selectively connecting the free end of one of said resistive elements to one of the slidable contacts of said high and low speed potentiometers, a second loop having in series therein the slidable contact of said driven potentiometer, a fixed resistance, a pair of negative temperature coefficient resistors, another fixed resistor and said switch means, first means responsive to the conduction of one of said transistors to cause said motor to rotate in one direction, second means responsive to the conduction of the other of said transistors to cause said motor to rotate in the opposite direction, and the junction of said pair of negative temperature coefficient resistors connected to the emitters of said transistors, the junction of said fixed resistor and one of said negative temperature coefficient resistors connected to the base of one of said transistors and the junction of said another fixed resistor and the other of said negative coefficient resistors connected to the base of the other transistor, whereby said motor shaft will position said element in accordance with the position of the slidable contacts of said high and low speed potentiometers.

4. The circuit, according to claim 3, wherein said negative coefficent resistors are variable negative coefficient resistors and selectively adjustable to compensate for ambient temperature variations.

5. The circuit, according to claim 4, wherein said variable negative coefficient resistors are thermistors.

6. The circuit, according to claim 5, further including in series between the junction of said negative coefficient resistors and said emitters a variable resistor.

7. The circuit, according to claim 3, wherein said first means includes a relay having one end of its coil connected to the collector electrode of one of said transistors and said second means includes another relay having one end of its coil connected to the collector electrode of the other of said transistors.

8. The circuit, according to claim 7, further including a second voltage source of a higher potential than said first voltage source, one side of said second source connected to the other ends of said relay coils, and the other side of said second source connected to said emitters.

9. The circuit, according to claim 8, further including relay interlock means for preventing simultaneous activation of said motor in said one and said another direction.

10. In a continuously selective thermally compensated control system, the circuit combination comprising: a driven tracking potentiometer and a manual set potentiometer each having a slide contact arm, a voltage source connected across said potentiometers, a resistive network having in series therein a pair of negative temperature coefficient resistors, said network connected across said slide contacts, a pair of transistors having their emitters connected to a point along said network between said negative resistors and their bases connected to said network on opposite sides of said negative resistors, means responsive to the conduction of one of said transistors for adjusting the slide contact of said tracking potentiometer in one direction, second means responsive to the conduction of the other of said transistors for adjusting the slide contact of said tracking potentiometer in the opposite direction whereby the slide contact of said tracking potentiometer will be adjusted relative to the position of the slide contact of said manual set potentiometer.

11. The system, according to claim 10, further including in said network series resistors disposed on opposite sides of said negative resistors.

12. The system according to claim 11, further including a variable resistance in series with said emitters.

13. The system, according to claim 12, further including a pair of series fixed resistors in parallel with said network and having their junction connected to said point along said network.

14. The system according to claim 13, wherein said means and said second means include relays which are responsive to the collector-emitter conduction of said transistors.

15. The system, according to claim 14, wherein said negative resistors are variable thermistors.

References Cited in the file of this patent
UNITED STATES PATENTS

| | | |
|---|---|---|
| 2,889,507 | Kennedy et al. | June 2, 1959 |
| 2,914,717 | Redding | Nov. 24, 1959 |
| 3,028,531 | Herberger et al. | Apr. 3, 1962 |